United States Patent
Fleming (10) Patent No.: US 7,107,313 B2
(45) Date of Patent: Sep. 12, 2006

(54) ADDING AND REMOVING PROCESSES IN A SINGLE VIEW

(75) Inventor: Roger A. Fleming, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 882 days.

(21) Appl. No.: 09/833,573

(22) Filed: Apr. 13, 2001

(65) Prior Publication Data

US 2002/0161849 A1    Oct. 31, 2002

(51) Int. Cl.
*G06F 15/16* (2006.01)
*G06F 11/00* (2006.01)

(52) U.S. Cl. ............ 709/205; 709/248; 714/13; 714/15; 707/204; 717/168; 717/174; 717/175; 717/176

(58) Field of Classification Search ............ 714/13, 714/15; 712/10, 228, 229; 717/168, 174, 717/175, 176
See application file for complete search history.

(56) References Cited

U.S. PATENT DOCUMENTS

| | | | | |
|---|---|---|---|---|
| 6,016,505 A | * | 1/2000 | Badovinatz et al. | 709/205 |
| 6,101,327 A | * | 8/2000 | Holte-Rost et al. | 717/170 |
| 6,694,450 B1 | * | 2/2004 | Kidder et al. | 714/15 |
| 6,748,438 B1 | * | 6/2004 | Palmer et al. | 709/229 |
| 2002/0016845 A1 | * | 2/2002 | Palmer et al. | 709/229 |

OTHER PUBLICATIONS

Moser et al., "Processor Membership in Asynchronous Distributed Systems", May 1994, IEEE, vol. 5, No. 5, pp. 459-473.*
Moser et al., "Membership Algorithms for Asynchronous Distributed Systems", 1991, IEEE, pp. 480-488.*

* cited by examiner

*Primary Examiner*—John Follansbee
*Assistant Examiner*—Ashok Patel (57) ABSTRACT

The present invention provides a system and method for promoting a probationary member to a full member in a distributed system. A probationary member includes a process in a distributed system that is intended to be added or intended to replace an existing process in the system. Prior to adding or replacing the probationary member, the probationary member is evaluated based on criteria associated with context information related to the system. Based on the evaluation, the probationary member may be promoted to a full member of the system or eliminated from the system. Therefore, the present invention provides the opportunity to evaluate the probationary member in the system, prior to the probationary member being promoted to a full member of the system. Additionally, the probationary member may be added or replace an existing process in a single view change. Therefore, fault tolerance is maintained when the probationary member is replacing a mirror in a fault-tolerant distributed system.

18 Claims, 5 Drawing Sheets

ADDING AND REMOVING PROCESSES IN A SINGLE VIEW

The following applications containing related subject matter and filed concurrently with the present application on Apr. 13, 2001 are hereby incorporated by reference: Ser. No. 09/883,650, entitled System and Method for Detecting Process and System Failures in a Distributed System, now U.S. Pat. No. 6,820,211 which issued on Nov. 16, 2004; Ser. No. 09/833,771, entitled System and Method for Detecting Process and Network Failures in a Distributed System Having Multiple Independent Networks, now U.S. Pat. No. 6,782,489 which issue on Aug. 24, 2004; and Ser. No. 09/833,572, and entitled Adaptive Heartbeats, now U.S. Pat. No. 6,782,496 which issue on Aug. 24, 2004.

FIELD OF THE INVENTION

The present invention is generally related to providing highly available processes in a distributed computer system.

BACKGROUND OF THE INVENTION

In recent years, reliable, high performance computer systems have been, and still are, in great demand. Users have also demanded the introduction and propagation of multi-processor distributed computer systems to support their computing processes (e.g., simulations, parallel processing, etc.). A distributed computer system generally includes a collection of processes and a collection of execution platforms (i.e., hosts). Each process may be capable of executing on a different host, and collectively, the processes function to provide a computer service. A failure of a critical process in a distributed system may result in the service halting.

Typically, each process in a distributed system maintains information, which may be updated, regarding the configuration of the system as a whole. To this purpose, processes often maintain a "view", which is a data structure representing the membership of the distributed system (i.e., a set of processes that constitute the system, and each process in the view is a member). It is often required that each process maintains a view consistent with the view maintained by the other processes in the system. All the processes in the system monitor the health of one another, for example, by sending heartbeats on network or internal communication links. This monitoring ability allows each process to update its view of which processes in the system are operational. Additionally, the processes in the system may communicate with each other for maintaining consistent views of the system.

A view change is a representation of membership that reflects the addition of a new member (i.e., a new process) or the removal of a current member from the view. For example, if the first process suspects that another process has failed, the first process can request a view change. Commonly, a technique for maintaining consistency between the processes includes the processes in the system voting on a view change. The majority of the members of the system must vote for a new view for it to be adopted.

A simple example of a distributed system is discussed herein to illustrate these concepts. One technique for minimizing the risk of a failure of a critical process in a distributed system includes implementing a fault tolerant system. A simple fault tolerant system may include three processes. Two of the processes are mirrors that provide system redundancy, which makes the system fault tolerant. If one mirror fails, the other has the ability to perform the role of the failed mirror in the system. A third process (called the "witness") is not a mirror and acts as a tie-breaker for view-consensus algorithms. If the third process agrees to a view change presented by one of the mirrors, the view change may be adopted by the system.

A distributed system may include members that have specific "roles". In the above example, two members may be mirrors of each other and provide users with a service, and the third witness-member may perform the function of maintaining view consistency.

While fault tolerant systems typically replace members due to the failure of a process, it may be desirable to replace a member that has not failed, hereafter referred to as the "victim". A victim may be used for the following situations: when the system is reconfigured to optimize performance; when a failed communication path requires a new process to be added via another communication path; when a host is removed from service for maintenance purposes, and the like.

Figure 5:
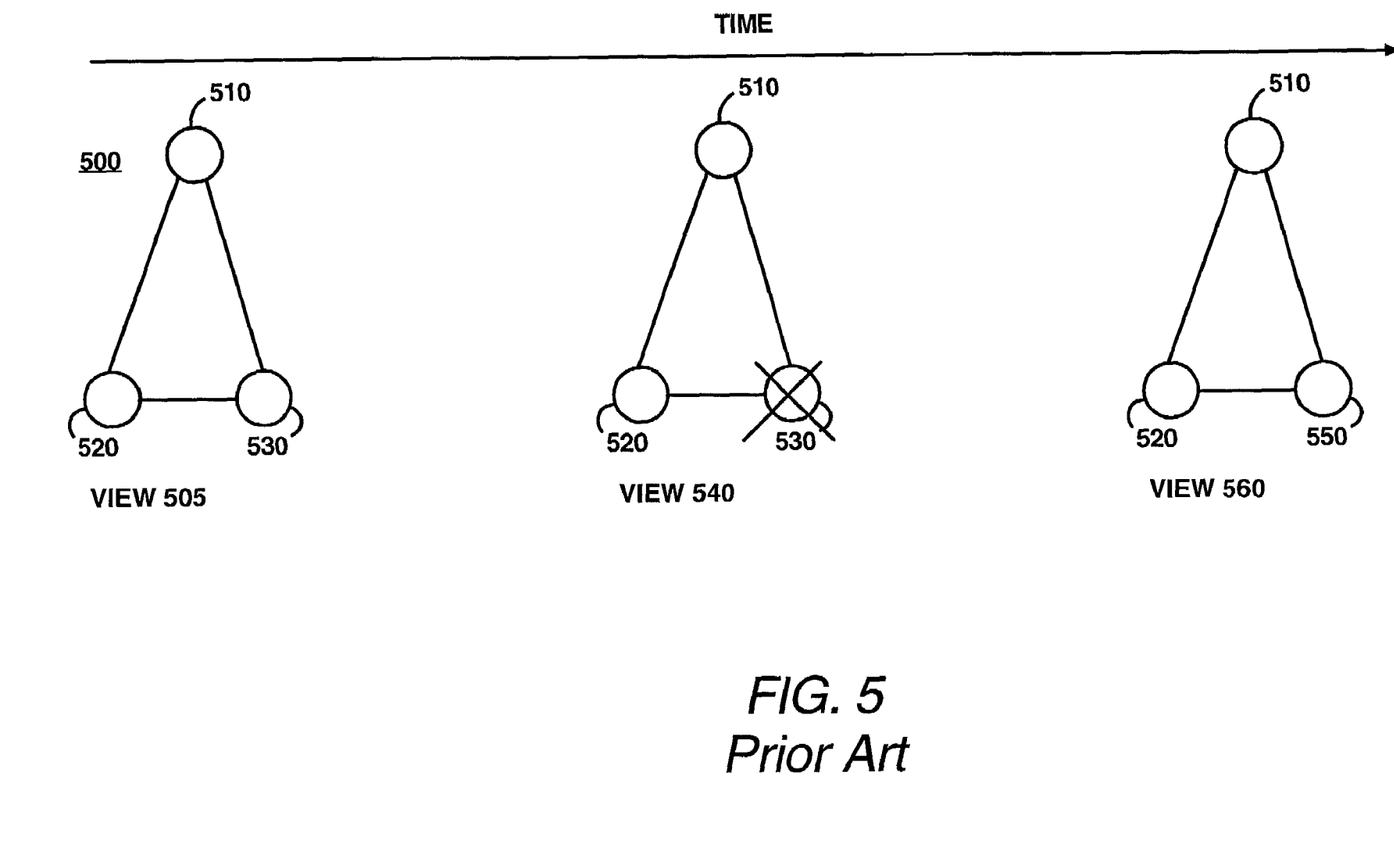
FIG. 5 illustrates a series of views for a conventional method.

A process may be replaced by killing the victim, which causes the system to repair itself by automatically replacing the victim. FIG. 5 illustrates a conventional method for killing a victim and merely relying on the system to replace the lost process through conventional failure detection and auto-repair ability.

In FIG. 5, view 505 illustrates normal operation of a three member system 500, including members (e.g., processes) 510, 520 and 530. Members 520 and 530 are mirrors. View 540 illustrates a first view change, including the removal of member 530. In view 540, member 530 is terminated (i.e., the victim is killed) and then removed from the view. In view 540, the system 500 is no longer fault tolerant, because no mirrors are available. Therefore, if member 520 fails, the computer service provided by system 500 may be halted. View 560 includes a second view change. In view 560, a new member 550 is added to the system for replacing member 530.

The process illustrated in FIG. 5 is "non-atomic", because more than one view change is required to replace a process. Because the system requires all three members in order to remain tolerant of failures, system 500 will not be fault tolerant during the interval after the victim has been killed and before the victim has been replaced. This temporarily exposes system 500 to the risk of system failure and halt in service. To avoid this risk, it is desirable to create a replacement member before killing the victim.

SUMMARY OF THE INVENTION

An aspect of the present invention is to provide a system and method for adding or replacing a process in a distributed system.

In one respect, the present invention includes a method including the steps of (1) launching a new member, hereinafter called a "probationary member", in the distributed system; (2) establishing any required communication paths between the probationary member and other processes in the system; (3) determining whether the probationary member satisfies criteria related to context information for the system; and (4) performing one of promoting the probationary member to a full member and eliminating the probationary member based on the determination in step (3).

The probationary member is promoted to a full member when certain criteria are satisfied. Then, another process in the system is eliminated if the probationary member is replacing another process in the system. Also, if the probationary member is replacing another process in the system, the probationary member replaces the process in a single view change.

The probationary member is not promoted to a full member in response to the criteria not being satisfied. The method of the present invention includes steps that may be performed by computer-executable instructions recorded on a computer-readable medium.

In still another respect, the present invention includes a distributed system having a plurality of processes in communication with each other. The distributed system further includes a first host capable of executing a first process of the plurality of processes; a second host capable of executing a second process of the plurality of processes; and at least one communication path connecting the first and second host. The second process is a probationary member evaluated using criteria related to context information for the system, and the probationary member is either promoted to a full member or eliminated based on the evaluation.

The system is operable to promote the probationary member to a full member in response to the criteria being satisfied and operable to eliminate the probationary member in response to the criteria not being satisfied.

The distributed system further includes a third process and a fourth process. The third and fourth processes are in bi-directional communication with each of the processes in the system via multiple communication paths. The first, third and fourth processes form a fault tolerant system, and at least two of the first, third and fourth processes are mirrors. The probationary member is operable to replace one of the mirrors.

The present invention provides a system and method that offers the flexibility to accept or reject a probationary member based on current context information. Additionally, the system and method of the present invention allows a collection of processes operable to provide a service to remain fault tolerant while adding or replacing a process.

Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
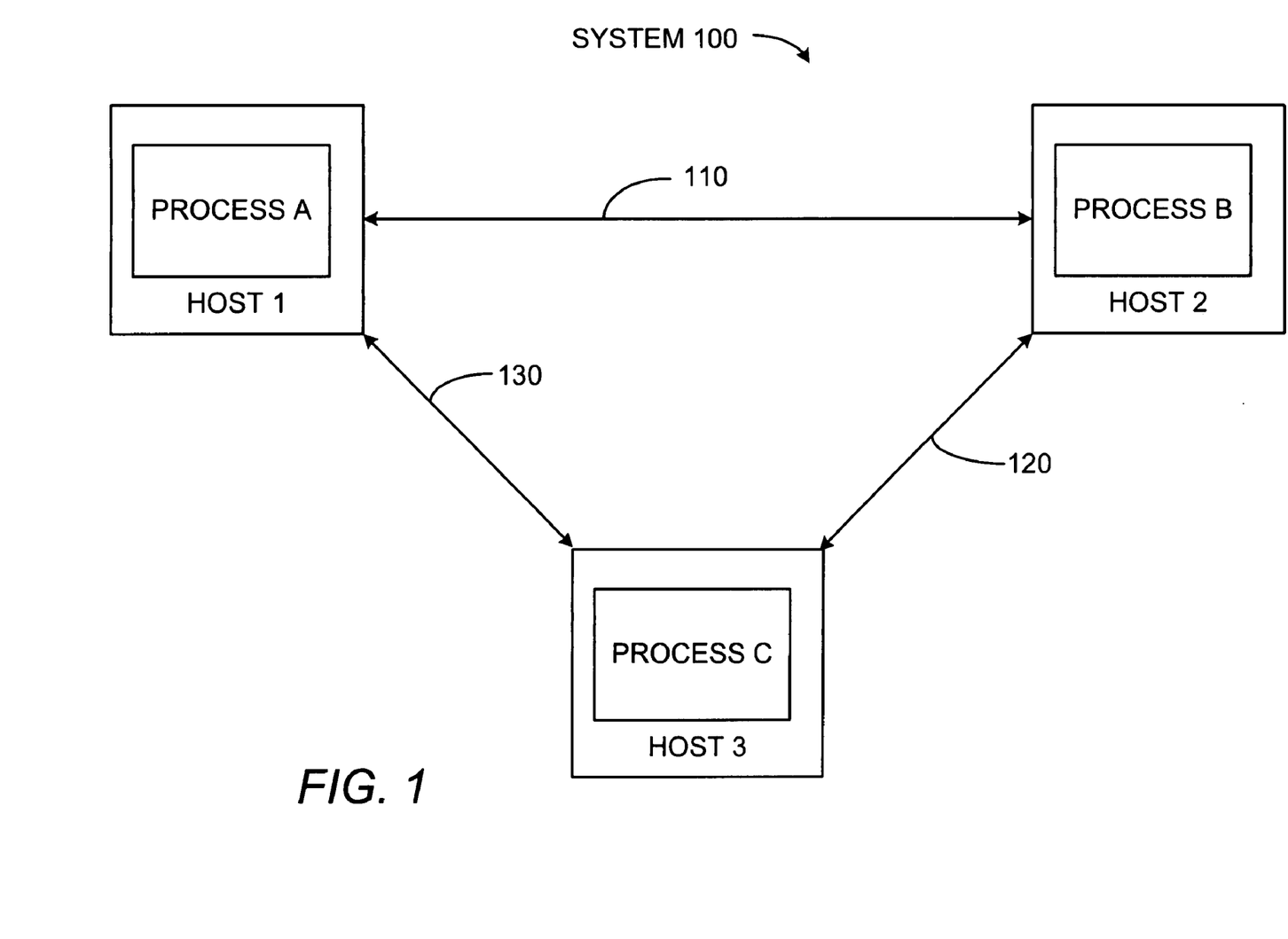
FIG. 1 illustrates an exemplary block diagram of a system employing the principles of the present invention.

FIG. 1 shows a fault tolerant system 100 in a distributed system employing the principles of the present invention. System 100 includes host 1, host 2 and host 3 executing process A, process B and process C, respectively. Processes A–C function collectively to provide a computer service. Processes A and B are mirrors that function to provide fault tolerance for system 100. System 100 may include all the processes or a subset of processes in a distributed system that share a view and function collectively to provide one or more computer services.

Hosts 1–3 are connected via communication paths 110, 120 and 130. Hosts 1–3 are typical nodes in a distribution system and can include a data processing system, memory and network interface, etc., all of which are not specifically shown. Communication paths 110, 120 and 130 include, for example, network links. Processes A–C may transmit heartbeats to one another on communication paths 110, 120 and 130 to detect a failed process. U.S. Pat. Nos. 6,782,489, 6,782,496, and 6,820,211, incorporated herein by reference, disclose techniques for detecting failed processes.

It will be apparent to those of ordinary skill in the art that an arbitrary number of hosts in system 100 may be supported in an arbitrary configuration. Furthermore, each host may execute one or more processes, and two hosts may be connected by more than one communication path. The present invention provides a method for adding or replacing a process in a single atomic operation (i.e., in a single view change). The method can be performed by a human operator using some type of tool, by a program (e.g., using an application program interface (API) providing unit administration functions), by an internal management component in the system itself that is attempting to reconfigure the system to reflect a more optimal configuration, and the like.

A probationary member may be created for adding or replacing a process in a system or in any role-based system. Before the probationary member can be promoted to a full member of the system (i.e., the probationary member is accepted into the view of the other processes in the system and is functional to operate collectively with other processes in the system to provide a computer service), criteria related to context information should be satisfied.

Context information includes, for example, whether the probationary member is being added to a system without replacing an existing process or whether a probationary member is replacing an existing process. When a probationary member is replacing an existing process, such as in fault-tolerant system 200, shown in FIG. 2, criteria may include successfully establishing communication between the probationary member and other full members in the system. The communication may be for exchanging heartbeats between the probationary member and the other processes in the system. Any required communication links between the probationary member and other processes in the system may be established in advance to avoid the risk of the inability to establish the links later. Criteria for replacing a process may also include, successfully obtaining a state transfer, known as a checkpoint, which establishes the probationary member as a faithful mirror with the same state as the original. A state transfer includes, for example, sending a memory image of one of the mirrors to the probationary member in a sequence of messages issued over the communication link.

When a probationary member is being added without replacing an existing process, criteria may include successfully establishing communication between the probationary member and other full members in the system and testing the probationary member for determining whether the probationary member is collectively functioning with the other processes in the system to provide a service.

It will be apparent to one of ordinary skill in the art that the criteria described above is not exhaustive, and different criteria may be tested depending on the configuration of the system and other known factors.

If criteria related to the context information is not satisfied, the probationary member is not replaced or not added. If criteria related to the context information is satisfied, the probationary member is promoted to a full member. Therefore, the present invention allows the distributed system to either accept or reject the probationary member after it is created, thereby introducing an element of adaptability.

Figure 2:
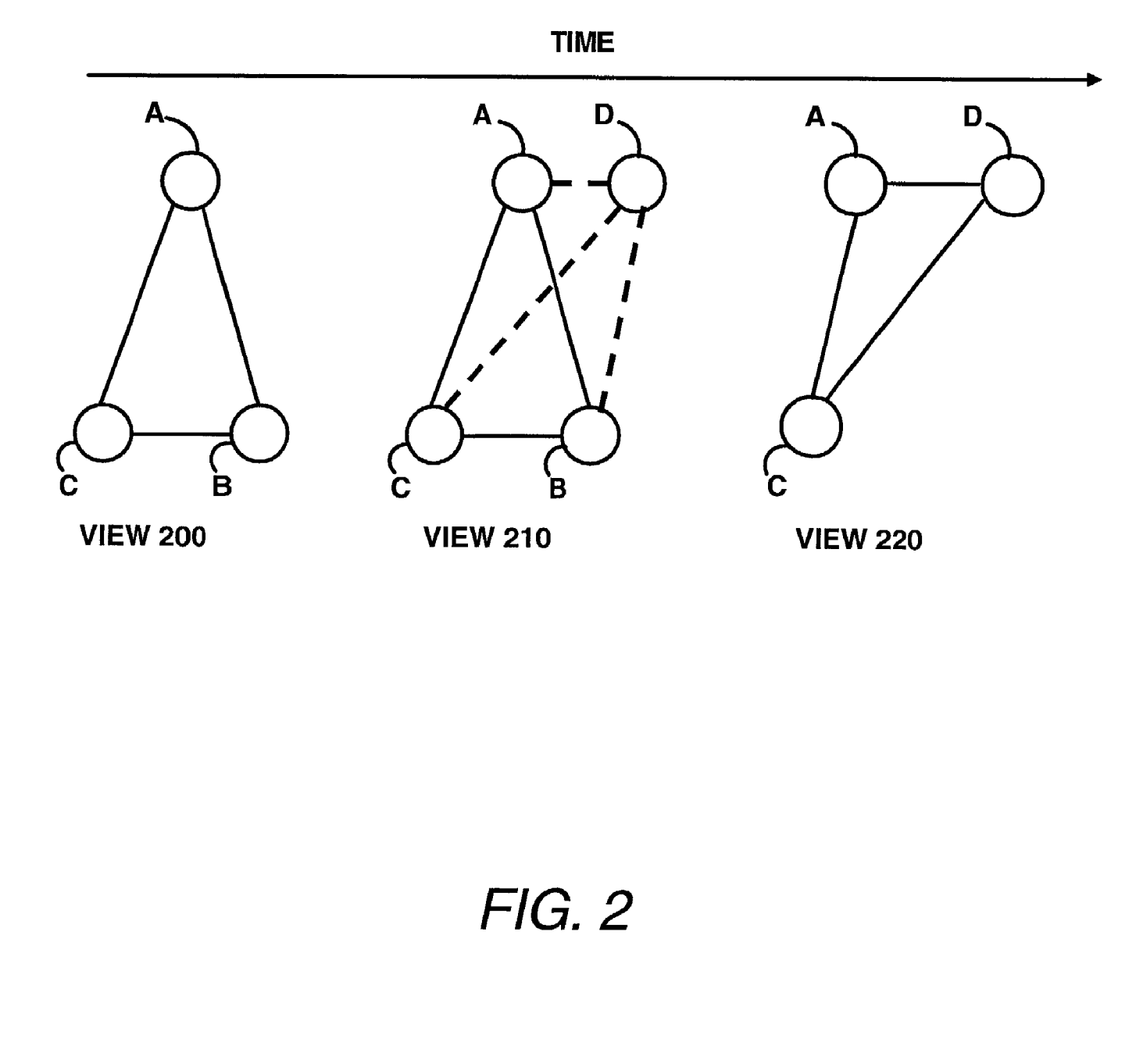
FIG. 2 illustrates a series of views for an exemplary method employing the principles of the present invention.

FIG. 2 illustrates different views during a replacement process performed by system 100, shown in FIG. 1. In FIG. 2, view 200 illustrates a normal operation of the three member distributed system 100, including members A–C. Members A and B are mirrors. View 210 is the next view. At this time, probationary member D is launched (e.g., executed on a host). Then connections are established between probationary member D and processes A–C, and necessary actions, such as a state transfer, are requested from processes A and C. In view 210, system 100 remains fault tolerant, because mirror process B has not been killed. Then, a series of context sensitive filters are applied to determine whether to promote probationary member D to a full member of system 100 or retain process B. If probationary member D is promoted, process B is killed. View 220 is the view after the replacement operation. At this time, process B is killed and replaced with probationary member D, now promoted to a full member. Only a single view change is necessary during the replacement process shown in FIG. 2, and system 100 remains fault tolerant throughout the replacement process.

The system and method of the present invention are not limited to replacing a probationary member in a fault-tolerant distributed system. It will be apparent to one of ordinary skill in the art that principles of the present invention may be applied to other distributed systems, including role-based systems, such as the role-based system shown in FIG. 4. Furthermore, probationary members may be utilized in distributed systems that may not use mirrors. For example, a probationary member may be added without replacing a member in a system.

Figure 3:
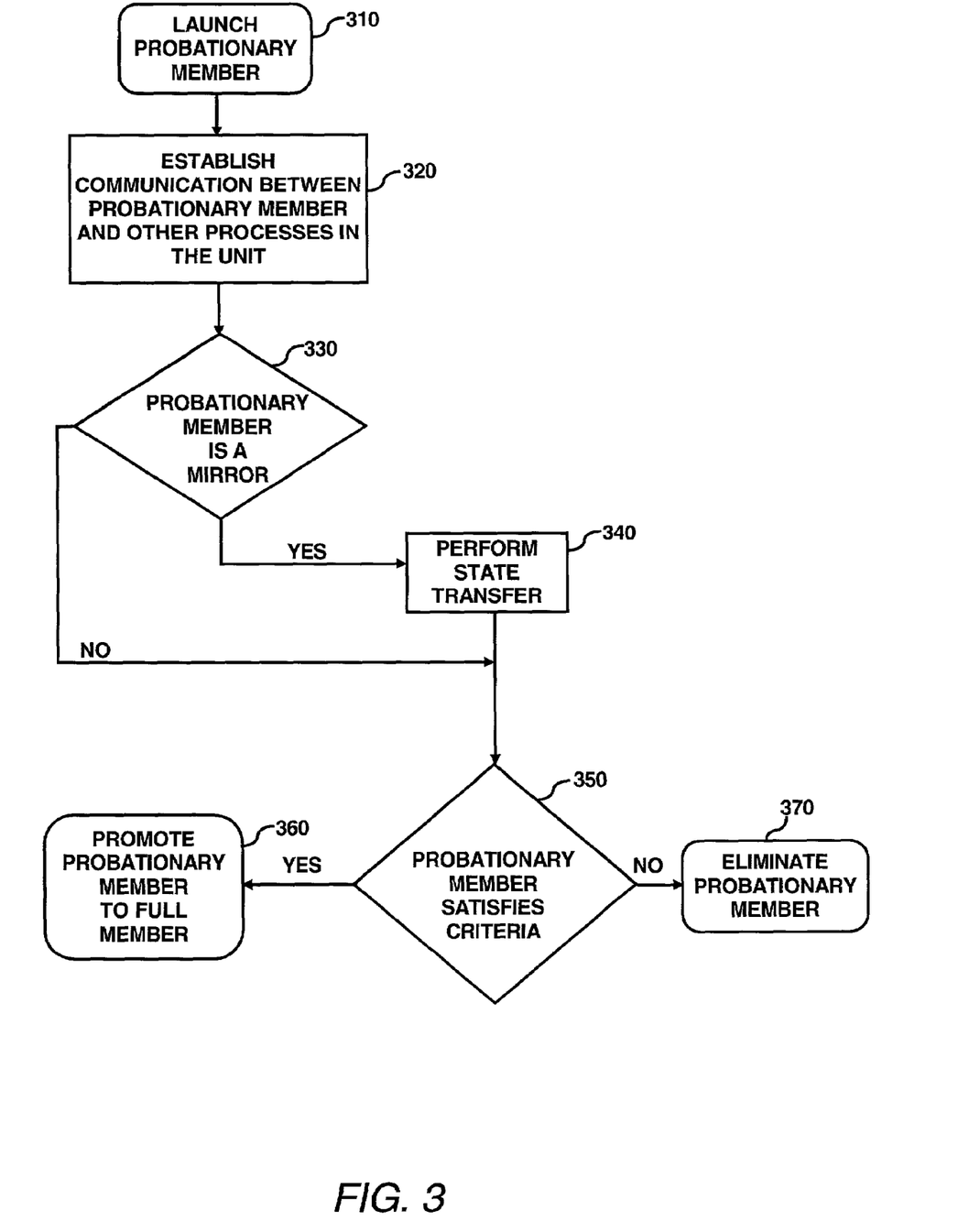
FIG. 3 illustrates an exemplary method employing the principles of the present invention.

FIG. 3 illustrates the steps performed by an exemplary method employing the principles of the present invention, as applied to the example of a fault tolerant system. In step 310, a probationary member is launched. In step 320, communication between the probationary member and all the other processes in the system is established.

In step 330, a determination is made as to whether the probationary member is replacing a mirror. For example, a probationary member may be replacing a mirror in a fault tolerant system, or a probationary member may be added to the system to provide fault tolerance. Alternatively, a probationary member that is not a mirror may be added to a system or replace a current member of the system.

If the probationary member is a mirror in step 330, a state transfer is performed (step 340). Then, the probationary member is evaluated and a determination is made as to whether criteria related to context information, including, for example, successful completion of the state transfer, are satisfied (step 350). Also, if the new process is not a mirror, step 350 is performed.

If the criteria are satisfied in step 350, the probationary member is promoted to a full member of the system, and a new view, including the promoted member, may be distributed to the system (step 360). Also, if the probationary member is replacing a process in the system, that process is killed.

If the criteria are not satisfied in step 350, the probationary member is eliminated (step 370).

It will be apparent to one of ordinary skill in the art that the method shown in FIG. 3 is applicable to distributed systems having a variety of configurations and having a process monitoring more than two processes. Generally, the method shown in FIG. 3 is applicable to any conventional distributed system, including a role-based distributed system (i.e., a distributed system including processes that perform specific functions), such as shown in FIG. 4.

Figure 4:
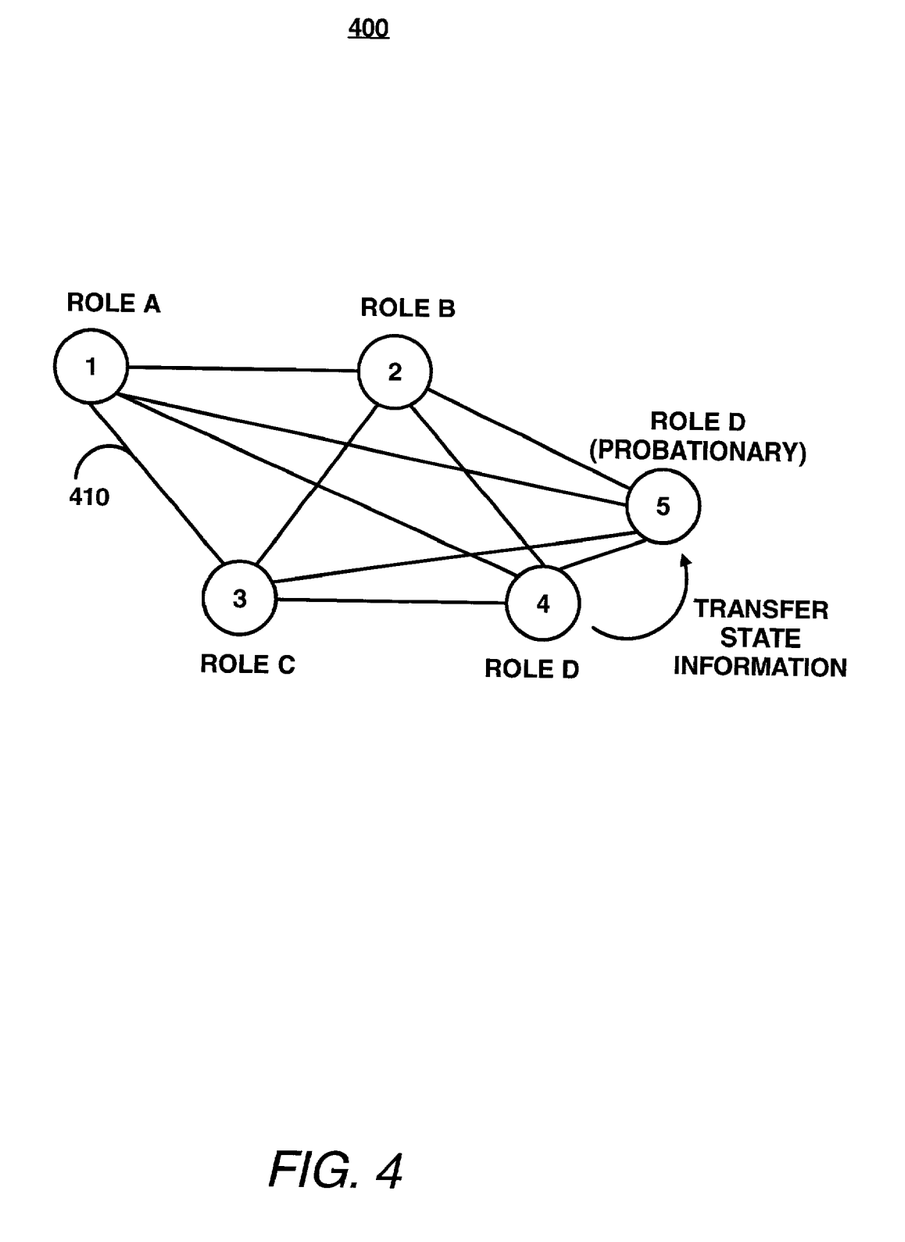
FIG. 4 illustrates an exemplary block diagram of a role-based system employing the principles of the present invention.

FIG. 4 illustrates role-based distribution system 400 including processes 1–5 connected by communication links 410. Processes 1–4 perform roles A–D, respectively, and process 5 is a probationary member that performs role D and is intended to replace a process in system 400 such as process 4.

For example, process 4 is performing role D on a host that is currently targeted for maintenance. Process 5 (i.e., the probationary member) is created on another host. Processes 1–3 establish bi-directional communication between themselves and the probationary member. Process 4, performing the current role D, transfers its state information to process 5. The system then decides whether to retain process 4 or process 5 based on context information. If the system retains the probationary member, process 4 is killed and process 5 is promoted to a full member. If the system retains process 4, process 5 is eliminated.

System 400 may also add a process without replacing a process. For example, system 400 may provide an automatic load-balancing feature and creates process 5 to balance the load. System 400 creates a probationary member (i.e., process 5) on a new host to even out the load among processes 1–4. If the configuration for system 400 changes, processes 1–4 may reject the probationary member to find a more optimal load balance. Then, process 5 would be eliminated. Alternatively, process 5 helps balance the load, and process 5 is promoted to a full member. For this example, state information is not transferred, even if process 5 is added, because process 5 is not a mirror.

The present invention provides an atomic replacement process that maintains fault tolerance for a distributed system. Also, the present invention is adaptable to changing conditions by allowing a probationary member to be accepted or rejected in light of current context information.

The method shown in FIG. 4 and described above may be performed by a computer program. The computer program can exist in a variety of forms both active and inactive. For example, the computer program can exist as software possessing program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. A method of performing one or more of adding and removing a process in a distributed system having a plurality of processes currently operational therein, said method comprising steps of:
   (1) launching a probationary member in said distributed system;
   (2) establishing a plurality of communication paths between said probationary member and each of said plurality of processes, respectively, in said system;
   (3) evaluating at least one criterion for promoting said probationary member to a full member, based on information obtained from said probationary member by said each of said plurality of processes on said plurality of communication paths; and
   (4) based on the evaluation performed in step (3), replacing a first process in said system and promoting said probationary member to a full member in a single view change in which all processes in said system are notified of said first process being replaced and said probationary member being promoted,
   wherein at least two of said plurality of processes are performed on separate processors that communicate with each other over a computer network.

2. The method of claim 1, wherein step (3) further comprises a step of:
   determining whether said at least one criterion is satisfied.

3. The method of claim 2, wherein said step (4) further comprises step of:
   promoting said probationary member to said full member in response to said at least
   one criterion being satisfied.

4. The method of claim 1, further comprising a step of determining whether said probationary member is replacing a mirror in said system.

5. The method of claim 4, further comprising a step of:
   performing a state transfer in response to said probationary member replacing said mirror.

6. The method of claim 1, wherein said step of replacing said first process and promoting said probationary member further comprises a step of:
   maintaining fault tolerance during said step of replacing said first process and promoting said probationary member,
   wherein a memory image of said first process is transferred by said first process to said probationary member and said probationary member indicates successful reception of said memory image prior to said first process being replaced.

7. The method of claim 6, wherein said at least one criterion is related to context information.

8. A distributed system including a plurality of processes in communication with each other, said distributed system comprising:
   a first host capable of executing a first process of said plurality of processes;
   a second host capable of executing a second process of said plurality of processes;
   a third host capable of executing a third process of said plurality of processes;
   a first communication path connecting said first and second hosts, a second communication path connecting said first and third hosts, and a third communication path connecting said second and third hosts; wherein
   said second process is a probationary member evaluated using at least one criterion for promoting said probationary member to a full member; and
   said probationary member being promoted to a full member in a single view change in which all processes in said system are notified of said probationary member being promoted and a first process in said system being replaced, based on the evaluation using said at least one criterion for promoting said probationary member to a full member, said at least one criterion being obtained based on information output by said second host that is received, on said first and third communication paths by said first and third hosts,
   wherein at least two of said plurality of processes are performed on separate processors that communicate with each other over a computer network.

9. The distributed system of claim 8, wherein said system is operable to promote said probationary member to said full member in response to said at least one criterion being satisfied.

10. The distributed system of claim 8, further comprising:
    a fourth host capable of executing a fourth process of said plurality of processes; wherein
    said first, third and fourth processes are a fault tolerant unit in said system;
    at least two of said first, third and fourth processes are mirrors; and
    said probationary member is operable to replace one of said mirrors.

11. The distributed system of claim 10, wherein said fault tolerant unit is operable to maintain fault tolerance in response to said probationary member replacing one of said mirrors.

12. A computer readable medium on which is embedded a program, the program executing a method for performing one or more of adding and removing a process in a distributed system having a plurality of processes currently operational therein, said method comprising steps of
    (1) launching a probationary member in said distributed system;
    (2) establishing a plurality of communication paths between said probationary member and each of said plurality of processes currently operational in said distributed system;
    (3) evaluating at least one criterion for promoting said probationary member to a full member, based on information obtained from said probationary member by each of said plurality of processes currently operational, respectively, by way of said plurality of communication paths; and
    (4) promoting said probationary member to a full member and replacing a first process in said system in a single view change in which all processes in said system are notified of said first process being replaced and said probationary member being promoted, based on the evaluation performed in step (3), wherein at least two of said plurality of processes are performed on separate processors that communicate with each other over a computer network.

13. The computer readable medium of claim 12, wherein said step (3) in said method further comprises a step of:
determining whether said at least one criterion is satisfied.

14. The computer readable medium of claim 13, wherein said step (4) in said method further comprises steps of:
promoting said probationary member to said 111 member in response to said at lest one criterion being satisfied.

15. The computer readable medium of claim 12, wherein said method further comprises a step of determining whether said probationary member is replacing a mirror in said system.

16. The computer readable medium of claim 15, wherein said method further comprises a step of:
performing a state transfer in response to said probationary member replacing said mirror.

17. The computer readable medium of claim 12, wherein said step of replacing said first process and promoting said probationary member further comprises a step of:
maintaining fault tolerance during said step of replacing said first process and promoting said probationary members, wherein a memory image of said first process is transferred by said first process to said probationary member and said probationary member indicates successful reception of said memory image prior to said first process being replaced.

18. The computer readable medium of claim 17, wherein said at least one criterion is related to context information.

* * * * *